May 1, 1956   F. A. HELFRECHT ET AL   2,743,950

SHAFT SEAL

Filed July 12, 1951

FRED A. HELFRECHT
VANDERVEER VOORHEES
INVENTORS

United States Patent Office 2,743,950
Patented May 1, 1956

2,743,950

SHAFT SEAL

Fred A. Helfrecht, Redwood City, and Vanderveer Voorhees, Los Altos, Calif., assignors to National Motor Bearing Co., Inc., Redwood City, Calif., a corporation of California Application July 12, 1951, Serial No. 236,394

5 Claims. (Cl. 288—2)

This invention relates to a sealing device, particularly a device for sealing fluids around moving shafting. More particularly, it relates to an oil seal for rotating shafting where it is desired to retain lubricating oil in bearings, gear housings, engine crank cases, etc. Still more particularly, the invention relates to a seal for shafting which is running eccentrically, that is, where the center of the shaft does not coincide with the center of rotation.

Figure 1:
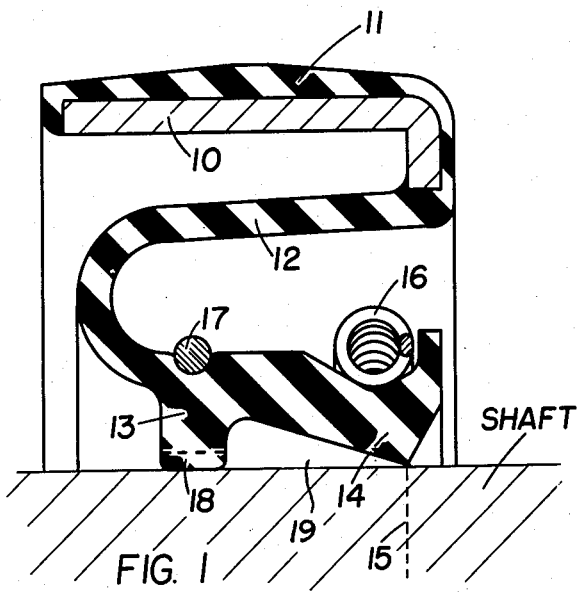
Figure 2:
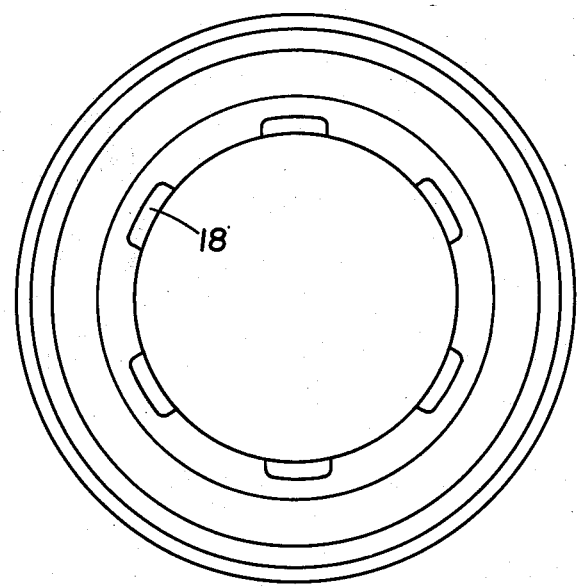

The invention is described in drawings in which Figure 1 shows a cross-sectional drawing of a preferred form of the seal designed for use with shafting having a high degree of eccentricity. Figure 2 is a left end view of the seal shown in Figure 1.

One object of the invention is to provide a seal for moving shafting which is sufficiently resilient to follow the movement of the shaft when running eccentrically without allowing the fluid to escape along the surface of the shaft beneath the sealing lip. Another object of the invention is to provide a seal which will follow the movement of a shaft which is rotating with a wobble as in the case where the shaft has been bent. Still another object of the invention is to provide a shaft seal of the narrow lip type which will successfully seal oil or other liquid on rotating shafting which is not running true, without the use of excessive pressure on the sealing lip which has heretofore caused deformation, over-heating and destruction of the material from which the seal is constructed.

According to our invention, we have provided a guiding element or ring associated with the sealing lip in such a manner as to remove from the sealing lip substantially all stresses caused by lateral displacement of the shaft while running, owing to eccentricity, wobble, or lack of concentricity between the shaft and the seal or seal housing. Between the guiding ring and the sealing lip we have provided sufficient flexibility to maintain accurate adjustment of radial pressure between the sealing lip and the shaft, either by the elastic material of the sealing lip itself or by the action of a spring member, garter spring, finger spring, or other pressuring device or combination thereof. Between the guide ring and the seal case is a flexing element so constructed and arranged as to allow the ring to follow the shaft movement freely and without interference from the flexing element.

The invention will be more clearly understood by referring to the drawings. Figure 1 is a cross-section of our guided seal wherein a flanged rigid ring 10, usually of steel, underlies an elastic ring 11 which is designed to make a fluid-tight engagement with the housing in which the seal is installed. Various features of construction such as those set forth in U. S. Patent 2,249,141 may be employed. Within the case rings 10 and 11 there is a bellows-like diaphragm or flexing section 12 of elastic material such as rubber, which extends to join the guide ring section 13. Beyond the guide ring 13 is the lip section 14 provided with a sharp edge or sealing line 15 to engage the shaft and prevent the flow of liquid in either direction.

Where space limitations permit, it is preferred to employ a garter spring 16 to accurately maintain the pressure on the sealing lip. It is also usually desirable to provide a rigid ring or reinforcing member 17 associated with the guide ring 13, thus maintaining its circularity and preventing elliptical distortion of the elastic sealing material by the action of a shaft badly off-center. Ring 17 may be conveniently a steel wire ring or a stamping which is snapped into a groove as shown. However, if desired, ring 17 may be molded into the rubber, in which case it may more closely approach the shaft surface and more effectively function to maintain the guide ring 13 in the form of a true circle. For convenience in molding, however, it is frequently desirable to mold the rubber part without the ring and snap the ring in during the assembly of the seal.

Inasmuch as the guide ring 13 should ride on the shaft at all times in order to function properly it is desirable to provide adequate lubrication between the shaft and the surface of the ring and this we accomplish in some cases by means of lubricating grooves 18 in the edge face of the ring. These grooves may take the form of short axial grooves as shown or other forms such as spirals, perforations, or indentations may be employed to accomplish the desired result of admitting oil or other liquid to the bearing surface of the guide ring.

When installing the seal shown in Figure 1, the open side containing the garter spring is placed toward the lubricating oil. Lubrication for the guide ring 13 is usually provided by packing chamber 19 between the guide ring and sealing lip with a suitable lubricant such as heavy oil or grease. The grooves 18 in the guide ring permit adequate lubrication reaching the sealing lip 14 to assure satisfactory operation.

In those cases where it is desired to have the sealing lip operate against the housing rather than against the shaft, i. e., in the case of external seals, we may reverse the construction of our seal and place the guide ring in the same relative position with respect to the case and the sealing lip to engage the housing bore. In all cases, whether the seal is external or internal, the guide ring lies intermediate the case and the lip with suitable flexing sections therebetween. The elastic material from which our seals are constructed may be rubber or any suitable synthetic elastomer.

Having thus described our invention what we claim is:

1. In a shaft seal of the type having a rigid case member and a flexible sealing member secured to said rigid case member and having a narrow flexible sealing lip adapted to contact a shaft, said seal having a flexible diaphragm interconnecting said lip and said case; a guide ring integral with the sealing member and composed of identical material with its inner surface adapted to encircle and lie adjacent said shaft, said guide ring being connected to an intermediate portion of said diaphragm so that flexing can occur between said guide ring and said rigid case member and also between said guide ring and said sealing lip; and a ring of rigid material on the opposite side of said diaphragm from said guide ring and directly in line therewith and backing up said guide ring for maintaining the circular shape of said seal even when it is subjected to unequal radial shaft pressures, as when said shaft is rotating about an axis eccentric to its center.

2. The seal of claim 1 in which said guide member is provided with a plurality of axial grooves extending its full width across its bearing surface which may come into contact with said shaft, so that fluid may pass from one side to the other of said guide member and insure adequate lubrication between said guide member and said shaft.

3. An oil seal for use between relatively rotating parts, said seal including a casing member adapted to be anchored immovably against one of said parts, a resilient flexible diaphragm having one peripheral rim secured to said casing member, means forming a V-shaped sealing lip secured to the other peripheral rim of said diaphragm with the apex of said lip positioned to engage the other of said relatively rotating parts and to bear thereagainst resiliently under slight pressure to insure a fluid-tight seal therewith, the lip bearing rim of said diaphragm including a cylindrical section of materially greater axial length than the thickness of said diaphragm, said cylindrical section being radially spaced from the apex of said lip when the same is assembled in its operating position between relatively rotating parts, a bearing ring secured to said cylindrical section at a point spaced remotely from said V-shaped lip, the bearing surface of said bearing ring having a diameter substantially the same as the part against which said lip seats and cooperating therewith to shift said flexible lip bodily with said bearing ring as said parts rotate eccentrically to one another, and said bearing ring having at least one notch traversing the exposed rim edge thereof whereby a lubricant can be fed to the interface between said bearing ring and the other of said relatively rotating parts.

4. An oil seal for use in sealing the space between a rotating shaft and a housing wall traversed by the shaft, said seal including a resilient bellows-like diaphragm of flexible material resistant to a lubricant, means for securing the outer rim edge of said diaphragm to a housing wall, the inner rim edge of said diaphragm including a cylindrical section concentric with and adapted to be radially spaced away from a shaft, and to form an annular chamber therewith, said cylindrical section having a sharp-edged lip positioned to engage and be stressed radially outward by a shaft, when mounted thereon, a guard bearing ring secured to said cylindrical section at a point spaced axially from said lip and adjacent the outer end of said section, said ring having an inner diameter substantially the same as that of the shaft for which said seal is designed and being operable to cause said cylindrical section to move in unison with the eccentric or sidewise movement of the shaft to avoid distortion of said sealing lip, the inner edge of said guard ring having passages extending from edge to edge thereof whereby material contained within the chamber between the ring and lip can flow through said passages.

5. An oil seal as defined in claim 4 including a continuous rigid ring carried by said cylindrical section closely adjacent said guard ring to reinforce said guard ring while leaving the sealing lip portion of said cylindrical section free to flex radially of the shaft, and resilient spring means surrounding said lip portion and depressing the same radially inward against a shaft.

References Cited in the file of this patent
UNITED STATES PATENTS

| Number | Name | Date |
|---|---|---|
| 2,181,203 | Reynolds | Nov. 28, 1939 |
| 2,196,337 | Loweke | Apr. 9, 1940 |
| 2,358,536 | Reynolds | Sept. 19, 1944 |
| 2,482,029 | Reynolds | Sept. 13, 1947 |
| 2,488,465 | Bourne | Nov. 15, 1949 |
| 2,542,141 | Horton | Feb. 20, 1951 |
| 2,574,062 | Reynolds | Nov. 6, 1951 |
| 2,598,094 | Augereau | May 27, 1952 |

FOREIGN PATENTS

| Number | Country | Date |
|---|---|---|
| 876,866 | France | Aug. 24, 1942 |
| 877,957 | France | of 1943 |